United States Patent [19]

Hodges

[11] 3,950,202

[45] Apr. 13, 1976

[54] METHOD OF MAKING A COMPOSITE NATURAL STONE VENEER PRODUCT

[76] Inventor: William E. Hodges, Royal York Hotel 100 Front St. West, Toronto, Ontario, Canada

[22] Filed: June 12, 1973

[21] Appl. No.: 369,308

[52] U.S. Cl. ............... 156/154; 428/116; 428/320; 156/263; 52/99; 52/378; 52/612
[51] Int. Cl.² ... B32B 3/12; B32B 31/18; E04C 2/04
[58] Field of Search ............ 161/68, 160, 168, 69; 52/612, 615, 98–99, 378, 618; 156/263, 153–154; 428/116, 320

[56] References Cited
UNITED STATES PATENTS

| | | | |
|---|---|---|---|
| 1,824,210 | 9/1931 | Jacobs | 52/99 |
| 1,893,430 | 1/1933 | McKenzie | 52/99 X |
| 2,850,890 | 9/1958 | Rubenstein | 52/612 X |
| 3,148,230 | 9/1964 | Behner | 52/378 X |
| 3,723,233 | 3/1973 | Bourke | 161/68 |
| 3,724,152 | 4/1973 | Castellarin | 52/612 |

*Primary Examiner*—Philip Dier

[57] ABSTRACT

A veneer product of a supporting stratum and a veneer of naturally-occurring, slabable stone material is provided where the thickness of the veneer of the stone material is such that it would not otherwise be generally capable of being manoeuvred or handled without breaking. Such stone material as marble, granite, and other architecturally useful and decorative materials are particularly contemplated. The supporting stratum may be such as plywood; but is more usually a cellular honeycomb material adhesively bonded to one surface of the thin stone material slab.

The composite stone veneer product is produced by first cutting slabs which are of a thickness that they may be handled and manoeuvred without breaking; adhesively bonding a layer of supporting material to each of the surfaces of the slabs; and re-slabbing the slab to form the composite stone veneer product where the newly cut veneer slab may be of a thickness that it cannot be handled without having first been adhesively secured to the supporting stratum. The stone material face of the composite stone veneer product may then be finished; and slabbing and finishing operations can be carried out manually or using standard stone working apparatus. When a plurality of slabs are re-slabbed at one time, sheets of force distributing material such as steel sheeting may be interposed between adjacent layers of supporting material which are, in turn, each adhesively bonded to one of a pair of adjacent slabs.

4 Claims, 4 Drawing Figures

METHOD OF MAKING A COMPOSITE NATURAL STONE VENEER PRODUCT

FIELD OF THE INVENTION

This invention relates to a composite stone veneer product and the method of making the same. Particularly, the invention relates to a composite stone veneer product of a naturally-occurring, slabable stone material where the thickness of the slab of stone in the veneer is such that the material could not otherwise be handled or manoeuvred without breaking.

BACKGROUND OF THE INVENTION

It has long been known to use such materials as marble, granite and other naturally-occurring stone materials for archtectural purposes. Many such materials — particularly some of the more common limestone materials — have been used especially for structural purposes for many centuries; particularly because of their relatively easy accessibility, availability, and ability to withstand compression forces. However, other such limestone materials as marble have also been used for decorative purposes — e.g., because they can be polished to a very high finish; and also because such materials as marble occur in very many different colours and with many different types of patterns. However, the use of newer building compositions and techniques in present-day construction of large buildings precludes the use of material such as marble and other like materials except for decorative purposes. More importantly, the supply of exotic marble is dwindling, and quarries are becoming more inaccessible and further away from the site of ultimate use of the marble or other material.

Thus, it becomes desirable to provide a product and a method for producing that product so that a surface of marble or other natural stone material may be applied to the walls and floors — and indeed, ceilings — of both the exterior and interior of a building. Because of the great weight of marble and other such materials, where the specific gravity may be anywhere from 1.9 to 3.0, it becomes desirable to provide a lightweight composite stone veneer product having a naturally-occurring stone surface but which is of a weight that can be easily handled. Also, it is desirable to provide as little thickness of stone material as possible so as to effect a reduction in costs and to extend the use of a given supply of material.

Other purposes to which seemingly solid stone material structural elements may be put include movable wall partitions, for example in the place of steel or gypsum-cladded, printed or vinyl-covered wall partitions; as well as for such other furniture and structural uses as desk and table tops, benches, billiard table tops, vanities, stair treads, doors, shelves, etc.

It is known, for example, that slabs of solid marble which are three-fourths of an inch or greater in thickness and two feet by four feet in area generally may require two men to handle them or to set them in place; and to install such slabs requires skilled craftsmen, especially when such slabs are being used for example as cladding on the walls of buildings. As noted above, the cost, accessibility and availability of the marble or other such material — even when it is used solely for architecturally decorative purposes — is such as to possibly make the delivered cost prohibitive, let alone the handling and installation costs of the marble. However, when large panels of a composite stone veneer proudct can be delivered to the job site for handling and installing by a relatively unskilled person, and at no greater cost than the smaller solid panels, the cost of the use of such materials for architecturally decorative purposes may not be prohibitive. Still further, when large slabs of naturally-occurring stone material are used in composite stone veneer products, which may even be gently curved in contradistinction to the previously usable thicker slabs of the same stone material, the opportunities for architectural design are greatly enhanced. More especially, bookmatched slabs of marble are able to be realized as a consequence of the method of making composite stone veneer products in accordance with this invention.

It is also desirable to provide a method of producing composite stone veneer products having at least one face of naturally-occurring slabable stone material where the method of producing the composite veneer can be carried out using standard stone working material such as slabbing gang saws, grinders, polishers, chip hammers, etc. It is also desirable to provide a method of producing composite stone veneer products having at least one face of a naturally-occurring stone material where the supporting stratum of the composite stone veneer product is a relatively inexpensive material which can withstand high compressive forces. Such a supporting stratum material may be plywood, or more particularly it may be commercially available honeycomb material which might be produced from paper, aluminum foil or other suitable materials.

BRIEF SUMMARY OF THE INVENTION

It is a purpose of this invention to provide a composite stone veneer product of a naturally-occurring, slabable stone material and a supporting stratum material; where the thickness of the slab of naturally-occurring stone material is such that it would not generally be capable of being manoeuvred or handled other than as part of the composite stone veneer product without breaking.

A further object of this invention is a method of making a composite stone veneer product of naturally-occurring, slabable stone material and a supporting stratum therefor, using standard stone-working machines of the sort well known in the art.

A still further object of this invention is to provide a method of making a composite stone veneer product having at least one face of a naturally-occurring, slabable stone material and a supporting stratum therefor; where the stone material may be finished or otherwise worked so that when it is installed it does not have the appearance of being part of a composite stone veneered product.

BRIEF DESCRIPTION OF THE DRAWINGS

These and other features and objects of the invention are more clearly described hereafter in association with the accompanying drawings, in which.

DESCRIPTION OF THE PREFERRED EMBODIMENTS

The invention provides a composite veneer product of a naturally-occurring slabable stone material and a supporting stratum therefor, where the composite stone veneer product comprises a thin slab of the naturally-occurring stone material having a thickness such that it may not be generally capable of being manoeuvred or handled without breaking; and a layer of a supporting stratum material which is adhesively bonded to one surface of the slab of the stone material. The invention further provides a method of making such a composite stone veneer product which comprises the steps of:

a. slabbing the naturally-occurring stone material to slabs having a thickness such that they may be manoeuvred and handled without breaking;

b. adhesively bonding a layer of supporting stratum material to each side of the slabs or at least one such slab;

c. securing at least one such slab which has the supporting stratum material adhesively bonded to each side thereof so that the slab may be re-slabbed by being subjected to a further slabbing operation; and d. proceeding with such further slabbing operation so that for each original slab, two composite stone veneer products are produced, each composite stone veneer product having a thin slab of the stone material adhesively bonded to a layer of the supporting stratum material.

The naturally-occurring, slabable stone material that may be used is generally material which may be chosen for architectural decorative purposes. Such material may include marble, granite, slate, limestone, onyx, tyndalstone, sandstone, bluestone, syenite, gneiss, soapstone, basalt and quartz. The nature of the supporting stratum material is discussed hereafter.

Figure 1:
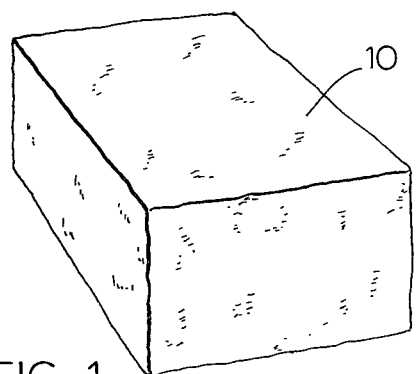
FIG. 1 is a general perspective view of a block of stone material of the sort contemplated to be used in this invention.

Referring to the drawings, FIG. 1 shows a block 10 of material such as marble as it has been removed from a quarry. The block of marble or other material may be extremely large, having dimensions of height and width, each in excess of four feet, and a dimension of length in excess of eight feet. Nonetheless, the block 10 may be placed in a gang slabbing saw of the sort well known in the art, and a plurality of parallel faced slabs 12 such as those shown in FIG. 2 may be produced. Some of the slabs at the left-hand side of FIG. 2 are shown having been spread apart one from another, in readiness for the next step of the production of the composite stone veneer product according to this invention.

Each of the slabs 12 is generally of a thickness such that the slabs may be manoeuvred and handled without breaking. In general, with reference to marble, that thickness may be approximately three-fourths of an inch.

Figure 2:
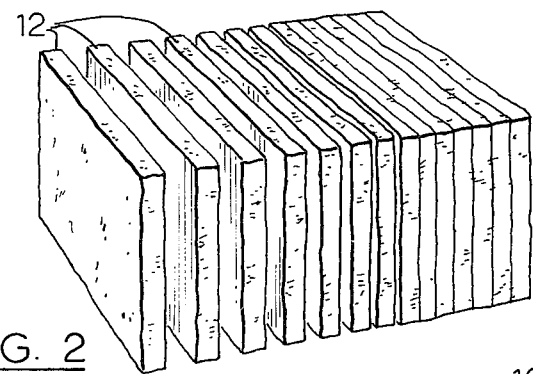
FIG. 2 is a perspective view of a block of material such as that of FIG. 1 after it has been cut into a plurality of slabs.

When the slabs 12 have been spread apart as noted in the left-hand side of FIG. 2, some or all of the slabs may have a plurality of layers of a material which is intended for use as a supporting stratum in the composite stone veneer produce interposed between them. Each of the layers of the supporting stratum material is respectively adhesively bonded on one surface to a surface of one of the slabs of stone material, so that each slab of stone material has a layer of supporting stratum material adhesively bonded to each side thereof.

Figure 3:
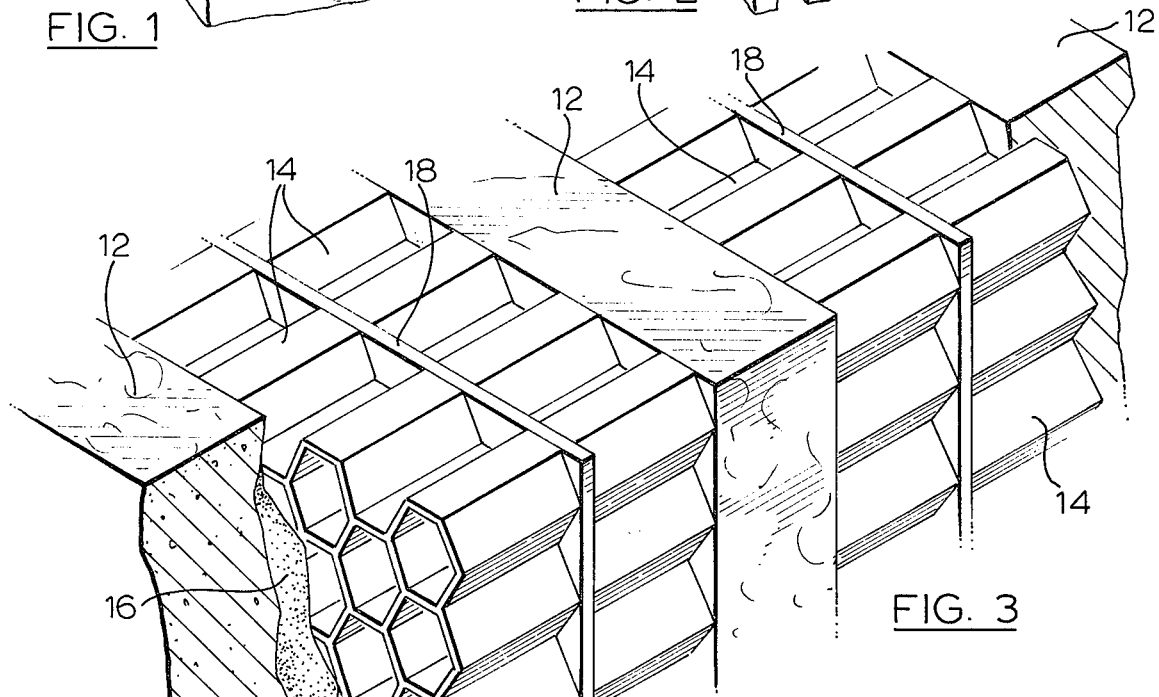
FIG. 3 is a perspective view to a much larger scale of a plurality of stone slabs and interposed supporting material strata and force distributing sheets; and, FIG. 4 is a view similar to FIG. 3 showing a composite stone veneer product having a stone material veneer of a thickness which would not be capable of being manoeuvred or handled without breaking.
Figure 4:
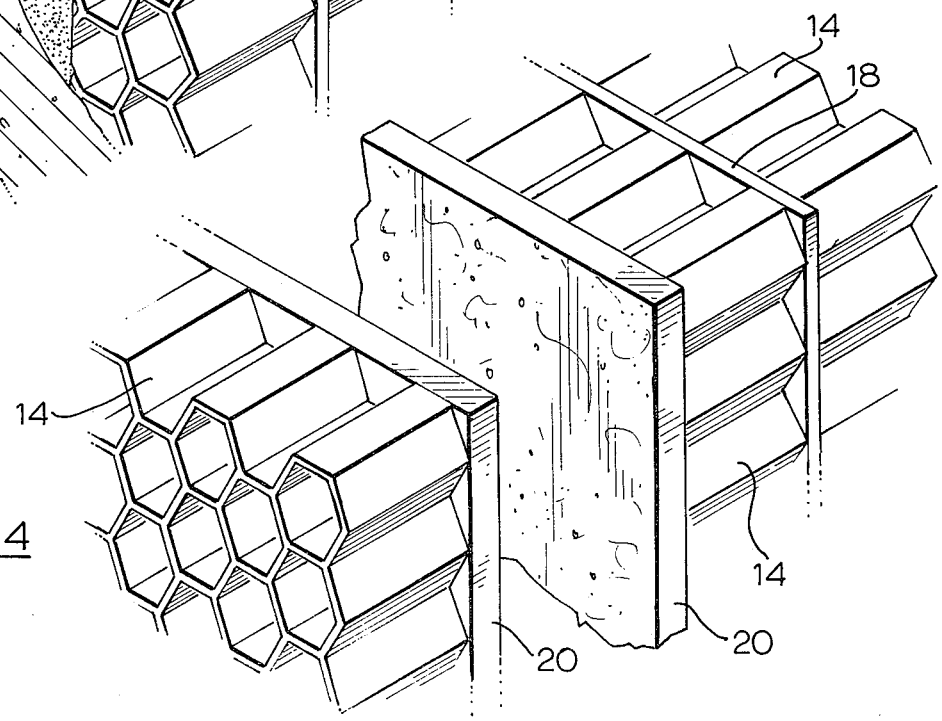

The material of the supporting stratum for use in the composite stone veneer product according to this invention may be such as plywood. More generally, however, the material may be a honeycomb material of the sort which is readily available. Such honeycomb material normally comprises a plurality of cells — generally hexagonal or octangonal in shape — such as illustrated in FIGS. 3 or 4. The honeycomb material may be made from suitable material such as kraft paper, aluminum foil or otherwise; and it may if required have facing on one or both sides of the supporting stratum material. Such material is capable of withstanding very high compression forces, especially when such forces are distributed over the face of the honeycomb material. In addition, the cells of the honeycomb material may be filled with heat or sound insulating material, such as foam polyurethane, polystyrene, etc.; or glass or asbestos fibres.

Generally, the adhesive which is used to bond the supporting stratum material such as honeycomb to each side of the slabs 12, is of a sort which is not affected by water, because the cutting, polishing or other finishing operations of the stone material are very often water-lubricated. In addition, where the honeycomb material is of a standard kraft paper construction, it may be coated with adhesive or other material so as to be rendered substantially water-repellant, fire retardant and vermine proof. Thus, one or a plurality of slabs 12 of stone material may have a layer 14 of supporting stratum material such as honeycomb adhesively bonded such as by adhesive 16 to each side of the slabs 12. In general, where more than one slab 12 is to be re-slabbed so as to form a number of composite stone veneer products — two from each slab 12 — sheets 18 of force distributing material such as steel sheeting are inserted between adjacent layers 14 of the supporting stratum material. In any event, it will be noted that an assembly now comprises two layers of honeycomb or other supporting stratum material for each layer or slab 12 of stone material, and sheets 18 between adjacent layers 14. Where a plurality of such layers are formed for re-slabbing, they are clamped together and secured so as to be subjected to the next slabbing operation. Whereas the centre-to-centre distance of the first slabbing operation to cut the slabs 12 may have been approximately one inch between saws; the centre-to-centre distance between saws for the next slabbing operation of the assembly such as shown in FIG. 3 may have to be in the order of 2¼ inches. In any event, the assembled and clamped stone slab/honeycomb layers are placed into a gang saw of the sort that was used to cut the slabs 12 in the first instance, and each slab 12 is again cut in the usual manner. The results of such further cutting or slabbing operation is shown in FIG. 4, where two veneers 20 are shown.

Each of the veneers 20 is less than one-half the thickness slab 12 from which they were cut, the difference in thickness having gone to dust during the slabbing operation. The thickness of each of the veneers 20 may, at this time, be of the order of three-sixteenths of an inch.

That is, it will be apparent that the slabbing operation has abraded away or pulverized a central planar section of significant thickness or volume to provide the veneers of essentially uniform thickness, e.g. the order of three-sixteenths of an inch, which are significantly thinner than one-half of the original starting slab 12 which had a thickness of the order of approximately three-fourths of an inch. In other words, the starting thickness of the unsupported slab 12 which was necessary to provide for the handling of same prior to the bonding of the layers 14 to each side thereof, also provided the necessary additional thickness to enable the slab to be accurately cut to end up with the requisite thin veneers of essentially uniform thickness ready for polishing to the desired finish.

Each veneer 20 is now of a thickness that would not generally be possible to be manoeuvred or handled — at least in large sizes. However, because each veneer 20 is adhesively bonded to a layer 14 of honeycomb or other supporting stratum material, the composite stone veneer product which is comprised thereby may be easily handled without damaging of breaking the thin veneer 20 of stone material. Indeed, it has been determined that thin slabs of marble which have been finished to ⅛ inch in thickness and which have been securely bonded to ⅝ or ¾ inch thickness kraft paper honeycomb material in accordance with this invention, may be gently curved in either direction without breaking the marble.

Of course, when it is desired to produce a composite stone veneer product in accordance with this invention, having both major faces with a stone veneer 20, the layers 14 of honeycomb would be adhesively secured at each side to adjacent slabs 12. Such two-sided veneer products would be used in doors, wall partitions, etc.

As noted, the veneers 20 may be polished or finished using well known slab finishing techniques — such as in conveyorized table polishers — so that the final finished thickness of the stone veneer 20 may only be in the order of one-eighth of an inch. Nonetheless, the overall thickness of the composite stone veneer product may be approximately three-quarters of an inch or more; and the product may be used in much the same way as solid slabs of marble of the same thickness. However, as noted, the weight of such composite stone veneer product according to this invention is considerably lower than that of the solid piece of marble, but the compressive strength of the composite stone veneer product may be as high or higher, depending on the nature of the core material. Thus, the composite stone veneer product according to this invention may be used for such purposes as table tops, benches etc.

It has also been found that thin layers of porous travertine-type marble may be made up in composite stone veneer products according to this invention; and such travertine veneers may be used as acoustically absorbing surfaces in much the same way as fibre board ceiling tiles are presently used.

When the material of the stone veneers 20 is such that it is translucent or even semi-translucent, such as onyx, it may be necessary after slabs 12 of the material have been cut to apply a colouring material or at least an opaque material to each side of the slabs 12 either before or at the same time as the adhesive 16 may be applied so as to bond the layers 14 of the supporting stratum material to the sides of the slabs 12, or as part of the adhesive coating. Thus, after the veneers 20 have been formed and have been finished there is no visual detraction from their appearance because of an ability to see or distinguish the form of the honeycomb or other supporting stratum material through the veneered stone face.

It may also be possible to slab and finish the material of the veneers 20 to approximately one-sixteenth of an inch thick; but in such cases, care must be taken that the stone material of such limited thickness may not be punctured or shattered, such as by being struck a sharp or glancing blow from a hard object.

It should also be noted, that, in common with all such naturally-occurring slabable stone materials, a removable protective coating would normally be applied to the surface of the finished stone material after final inspection.

The supporting laminate or stratum may, as noted, be comprised of material such as plywood or honeycomb structures of paper, metal or suitable plastic material; or the supporting stratum may be comprised of material such as formed, ribbed or moulded plastic materials, moulded or cellular construction boards of various sorts including glass and asbestos fibres, wood chips, wood fibres, syporex, portland cement compounds, etc.

Notwithstanding the additional handling and the additional slabbing operation, the installed price of a composite stone veneer product according to this invention — particularly in such circumstances as the walls of a building — may be less than 50 percent of the installed price of a similar, solid stone material. The savings are realized not only in the delivered price of the finished stone material to the work site, but also in the labour costs required for installing the material to its final position.

Other materials than marble or granite have been mentioned above for use in composite stone veneer products according to this invention, and for manufacture into composite stone veneer products also in accordance with this invention. Such other products particularly include other stone than marble, such as granite, slate, onyx, etc. It has been noted that it is generally necessary to install or interpose sheets 18 of force distributing material such as steel, or other metal sheeting, when a plurality of slabs 12 are clamped together along with supporting stratum layers 14 which are bonded to the surfaces of the slabs 12 for further slabbing operation so as to form stone veneers 20.

Relative dimensions which have been discussed above are by way of example only, and are not intended to be limiting. In any event, it is evident that other amendments or alterations may be made to the composite stone veneer product — such as by edging a two-sided composite stone veneer product with stone material of the same type so that it appears to be solid from all angles — or by somewhat changing the sequence of steps discussed above, without departing from the spirit and scope of the appended claims.

What I claim is:

1. A method of making a composite stone veneer product having a veneer layer of a naturally-occurring, slabable stone material of several square feet in area bonded to supporting material including the steps of:
   a. saw cutting the naturally-occurring stone material to form slabs having parallel side faces and a thickness of the order of not greater than three-quarters of an inch and significantly thicker than twice the thickness of the desired ultimate veneer layer of a composite stone veneer product so that said slabs may be manoeuvered and handled without breaking;
   b. adhesively bonding a layer of supporting material to each of said parallel side faces of one or more of said slabs;

c. maintaining one or more of the slabs with the supporting material adhered thereto in a secured position so that said one or more slabs can be subjected to a further saw cutting operation; and d. saw cutting through said one or more slabs in a direction parallel to and midway between said parallel side faces to abrade away a significant central volume of the naturally-occurring stone material lying between two parallel planes parallel to said side faces so as to form at least two composite stone veneer products each having a veneer of said naturally-occurring stone material of essentially uniform thickness, the thickness of each veneer being of the order of at least three-sixteenths of an inch and significantly less than one-half the thickness of said one or more slabs.

2. The method of claim 1 where said naturally-occurring stone material is one of the group consisting of marble, granite, slate, limestone, onyx, tyndalstone, sandstone, bluestone, syenite, gneiss, soapstone, basalt and quartz.

3. The method of claim 1 where said supporting material is a cellular honeycomb material having a plurality of cells aligned substantially perpendicularly to each surface of the slab to which it is adhesively bonded.

4. The method as claimed in claim 1 additionally comprising subjecting the veneer of each of said composite stone veneer products to a polishing operation.

* * * * *